United States Patent

[11] 3,628,850

[72] Inventors: Eiichi Yamazaki Ichihara; Kooichi Maruyama, Mobara; Iwao Ogura, Tokyo, all of Japan
[21] Appl. No. 13,640
[22] Filed Feb. 24, 1970
[45] Patented Dec. 21, 1971
[73] Assignee Hitachi, Ltd. Tokyo, Japan

[54] CORRECTING LENS
10 Claims, 18 Drawing Figs.
[52] U.S. Cl. ........................... 350/175 R, 95/1 R, 350/204, 350/189, 350/213
[51] Int. Cl. ........................................... G02b 3/00
[50] Field of Search ........................................... 350/175, 189, 213, 204; 95/1

[56] References Cited
UNITED STATES PATENTS

| | | | |
|---|---|---|---|
| 2,915,935 | 12/1959 | Pabst et al. | 350/213 X |
| 3,100,418 | 8/1963 | Posner | 350/204 UX |
| 3,279,340 | 10/1966 | Ramberg et al. | 350/189 UX |
| 3,495,511 | 2/1970 | Javorik | 350/189 UX |

Primary Examiner—John K. Corbin
Attorney—Craig, Antonelli & Hill

ABSTRACT: A correcting lens for use in the formation of fluorescent dots on a color picture tube, which has its effective surface divided into a plurality of sections each of which consists of a flat or curved surface as designated and at least one of which has borderlines of discontinuity in at least two directions.

PATENTED DEC 21 1971
3,628,850
SHEET 1 OF 2
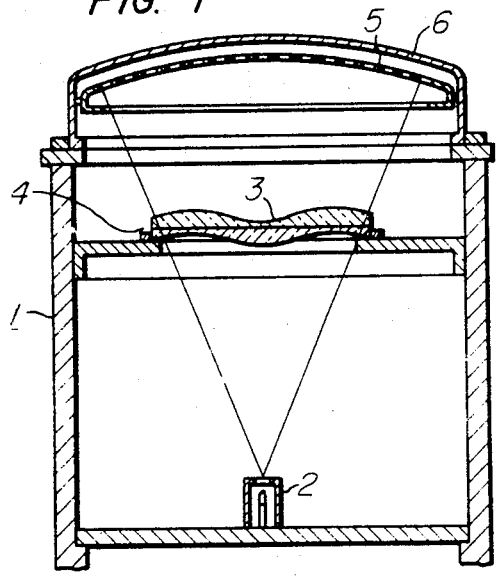
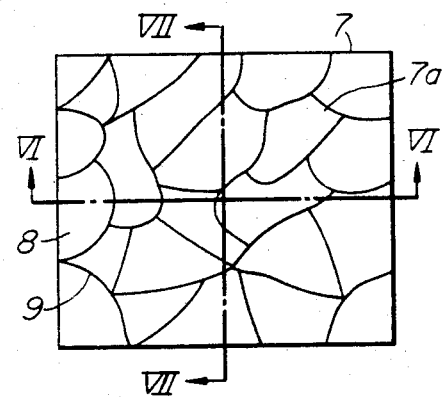
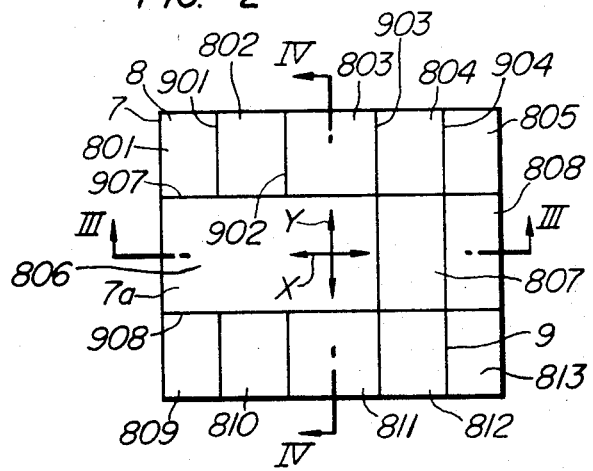
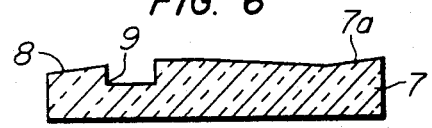
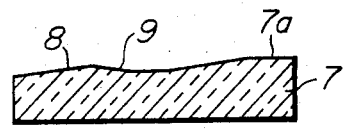
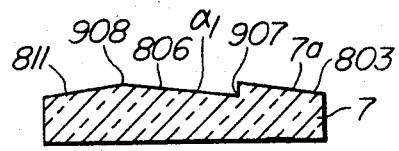
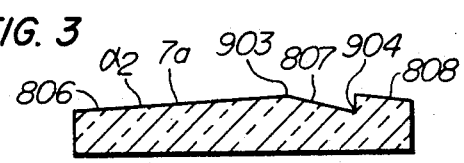
INVENTORS
EIICHI YAMAZAKI, KOOICHI MARUYAMA
and IWAO OGURA
BY Craig, Antonelli, Stewart & Hill
ATTORNEYS

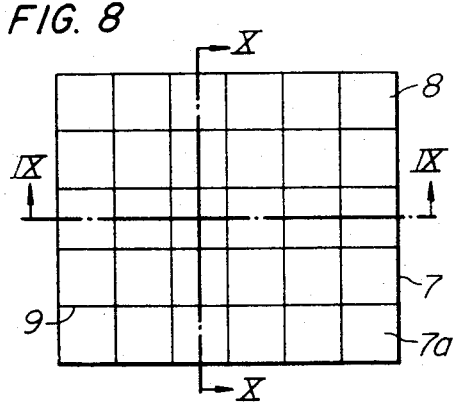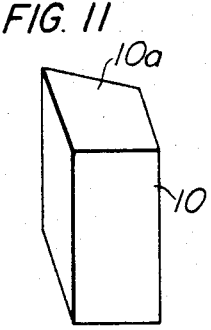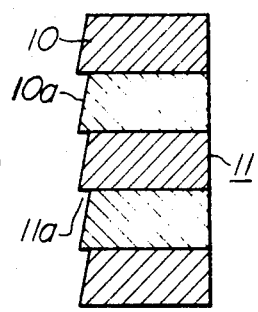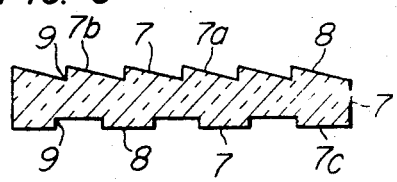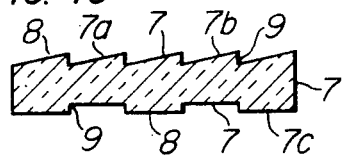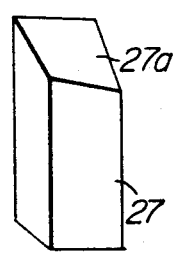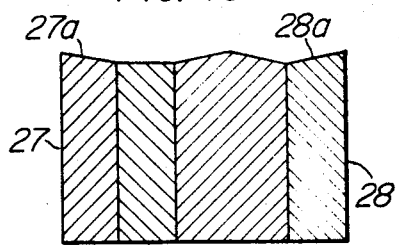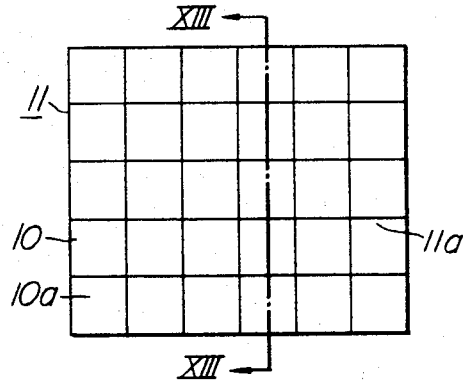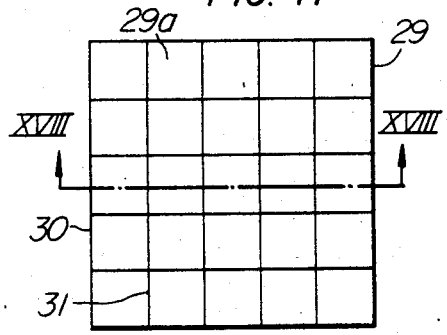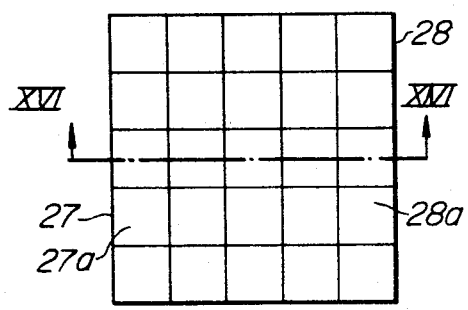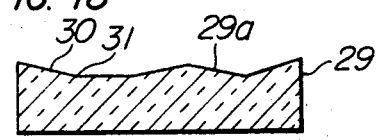

CORRECTING LENS

BACKGROUND OF THE INVENTION

1. Field of the Invention

The present invention relates to a correcting lens used in the formation of fluorescent dots on the fluorescent screen of a color picture tube, and to a method of producing the same. 2. Description of the Prior Art It is well known that the fluorescent screen of a shadow mask-type color picture tube is normally formed by coating a tricolor fluorescent material by a photographic method.

The exposure in the formation of such fluorescent screen is effected using an exposure apparatus as shown in FIG. 1 which is generally called lighthouse. Namely, the lighthouse 1 shown in FIG. 1 comprises a light source means 2 and a lens unit 4 including a correcting lens 3 for getting the rays (not shown), emanated from said light source means 2, close to the paths of electron beams in the practical use of the tube. In the use of the lighthouse 1, constructed as described above, a panel 6 is mounted on the lighthouse in the manner shown, with a shadow mask 5 installed therein.

As described, the correcting lens 3 is necessary for the purpose of getting the rays of exposure light as close to the paths of actual electron beams as possible and, therefore, it has an extremely complicated curved surface.

As the correcting lens, those having a continuous curved surface as the effective surface have commonly been used in most cases. With such a correcting lens, however, the rays of exposure light can be brought near to the paths of actual electron beams only to a limited extent and it is occasionally impossible to arrange precisely the fluorescent dots in conformance to the spots of electron beams over the entire surface of the fluorescent screen. Therefore, a color picture tube having a fluorescent screen formed by the use of such correcting lens, had the drawback that the quality of the picture image was impaired due to color shift.

As a means to obviate the foregoing drawback, a correcting lens of the type as disclosed, for example, in Japanese Pat. Publication No. 4459/1968 based on U.S. Pat. application Ser. No. 353,052 filed on Mar. 19, 1964, now U.S. Pat. No. 3,279,340 has been proposed which is composed of a plurality of lens units each having a continuous curved surface in a peripheral direction and a stepped discontinuous surface only in the radial direction. However, this type of correcting lens has the disadvantages that the registration of the individual lens units is difficult and that the correction by the continuous curved surface in the peripheral direction undergoes a limitation, and a desired correction cannot always be obtained.

SUMMARY OF THE INVENTION

An object of the present invention, therefore, is to provide a correcting lens for use in the formation of fluorescent dots on a color picture tube, which has its effective surface divided into a plurality of sections each of which consists of a flat or curved surface inclination which is so designed that light paths through said surface in an exposing process simulate precisely corresponding electron beam paths in an operation of the color picture tube and at least one of which has borderlines of discontinuity in at least two directions.

Another object of the invention is to provide a method of producing a correcting lens having such a structure that the effective surface thereof is divided into a plurality of sections each of which consists of a flat or curved surface, inclination of which is so designed that light paths through said surface in an exposing process simulate precisely corresponding electron beam paths in an operation of the color picture tube and at least one of which has borderlines of discontinuity in at least two directions.

BRIEF DESCRIPTION OF THE DRAWINGS

FIG. 1 is a cross-sectional view of an exposure apparatus, for explaining the exposing process in the formation of the fluorescent screen of a color picture tube;

FIG. 2 is a plan view of an embodiment of the correcting lens according to the present invention;

FIG. 3 is a cross-sectional view taken on the line III—III of FIG. 2;

FIG. 4 is a cross-sectional view taken on the line IV—IV of FIG. 2;

FIG. 5 is a plan view of another embodiment of the correcting lens according to the present invention;

FIG. 6 is a cross-sectional view taken on the line VI—VI of FIG. 5;

FIG. 7 is a cross-sectional view taken on the line VII—VII of FIG. 5;

FIG. 8 is a plan view of still another embodiment of the correcting lens according to the present invention;

FIG. 9 is a cross-sectional view taken on the line IX—IX of FIG. 8;

FIG. 10 is a cross-sectional view taken on the line X—X of FIG. 8;

FIG. 11 is a perspective view of an example of the unit block of the metal mold used in the production of the correcting lens according to the present invention;

FIG. 12 is a plan view of an example of the metal mold used in the production of the correcting lens according to the invention;

FIG. 13 is a cross-sectional view taken on the line XIII—XIII of FIG. 12;

FIG. 14 is a perspective view of another example of the unit block of the metal mold used in the production of the correcting lens according to the invention;

FIG. 15 is a plan view of an example of the metal mold used in the production of the correcting lens according to the invention;

FIG. 16 is a cross-sectional view taken on the line XVI—XVI of FIG. 15;

FIG. 17 is a plan view of an example of the correcting lens produced by the method of this invention; and FIG. 18 is a cross-sectional view taken on the line XVIII—XVIII of FIG. 17.

DESCRIPTION OF THE PREFERRED EMBODIMENTS

First of all, an embodiment of the correcting lens according to the invention will be described with reference to FIGS. 2, 3 and 4, of which FIG. 2 is a plan view of the correcting lens, FIG. 3 is a cross-sectional view taken on the line III—III of FIG. 2 and FIG. 4 is a cross-sectional view taken on the line IV—IV of FIG. 2; and in which the correcting lens is generally indicated by numeral 7. As shown, the effective surface 7a of the correcting lens 7 is divided into a plurality of sections 8 (into 13 sections in the embodiment shown), each consisting of a flat or curved surface as designated, and having borderlines 9 of discontinuity with respect to the adjacent sections.

Describing in further detail with reference to a section 806 shown in FIG. 2, this section adjoins the section 807 in the X direction, and the sections 801–803 and 809–811 in the Y direction, and is isolated from these adjoining sections along a borderline 903 of discontinuity in the X direction and along borderlines 907 and 908 of discontinuity in the Y direction. Thus, the section 806 has borderlines of discontinuity in both the X direction and the Y direction. Furthermore, as shown in FIGS. 3 and 4, the section 806 consists of a flat surface, inclining in the X direction as indicated at $\alpha_1$ and in the Y direction as indicated at $\alpha_2$. The inclinations $\alpha_1$ and $\alpha_2$ are designed in such a manner that the light paths passing through the section 806 at the time of exposure of the fluorescent screen of the color picture tube simulate the corresponding paths of electron beams projecting through the shadow mask to the fluorescent dots.

Another embodiment of the correcting lens according to the invention is shown in FIGS. 5–7, of which FIG. 5 is a plan view and FIGS. 6 and 7 are cross-sectional views. The correcting lens 7 of this embodiment has its effective surface 7a divided into a plurality of sections 8 and each section 8 has an indeterminate shape. Therefore, each section has borderlines 9 of discontinuity in all directions between it and the adjoining sections.

FIGS. 8-10 are a plan view and cross-sectional views of still another embodiment of the correcting lens according to the invention. The correcting lens 7 shown has both its surfaces 7b and 7c divided into a plurality of sections 8 respectively and each section of each surface has borderlines 9 of discontinuity between it and the adjoining sections.

Now, a method of producing the correcting lenses of the present invention as described above, will be explained hereinafter: FIG. 11 is a perspective view showing one block of a metal mold, corresponding to one section of the divided effective surface of the correcting lens. The top surface 10a of the block, generally designated at 10, is shaped into a desired configuration complementary to the predetermined flat or curved surface of the corresponding section of the correcting lens. A plurality of the block 10, corresponding to the respective sections and each having been shaped in the manner described above, are assembled according to the shape of the correcting lens, to form a metal mold 11 as shown in FIGS. 12 and 13, and then the material of the correcting lens, e.g., a solution of synthetic resin such as an acrylic resin (not shown), is poured onto the upper surface 11a of the metal mold 11. After curing the resin, the resultant body of correcting lens is subjected to polishing as required, to obtain a finished correcting lens (not shown).

As described above, the correcting lens of the present invention has its effective surface or surfaces divided into a plurality of sections, each of which provides a predetermined flat or curved surface and at least one of which has borderlines of discontinuity in at least two directions, e.g., in the X-direction and the Y-direction or in the radial directions and the peripheral directions. Therefore, it is possible to incline any section of the effective surface of the correcting lens in any direction and at any angle. Thus, by the use of the correcting lens according to the present invention, excellent advantages can be obtained in that it becomes easy to get the rays of exposure light close to the paths of actual electron beams in the formation of fluorescent dots, in that the positions of the fluorescent dots on the fluorescent screen can be moved in any direction, in that, therefore, the fluorescent dots can be arranged in conformance to the spots of electron beams over the entire surface of the fluorescent screen, and in that consequently the problem of color shift resulting from displacement of the fluorescent dots can be eliminated.

Next, a method of producing the correcting lens of the type shown in FIGS. 17 and 18 will be described with reference to FIGS. 14-16. FIG. 14 is a perspective view showing one block of a metal mold, corresponding to one or a plurality of sections of the effective surface of the correcting lens. The top surface 27a of the block, generally indicated at 27, is shaped into a desired configuration complementary to the predetermined flat or curved surface of the corresponding section or sections of the correcting lens. A plurality of the thus shaped blocks 27 are assembled according to the shape of the correcting lens, to form a metal mold 8 as shown in FIGS. 15 and 16. Then, the material of the correcting lens, e.g., a solution of synthetic resin such as an acrylic resin, is poured onto the upper surface 28a of the metal mold 28, though not apparent in the drawings. After curing of the resin, the resultant body of the correcting lens is subjected to polishing as required, to obtain a finished correcting lens as shown in FIGS. 17 and 18.

The correcting lens 29 thus produced has the effective surface 29a thereof divided into a plurality of sections 30 in conformance with the metal mold 28, and each section 30 has borderlines 31 of discontinuity between it and the adjoining sections, defining a predetermined flat or curved surface.

As will be clear from the foregoing, the method of the present invention for use in the production of a correcting lens of the type having its effective surface divided into a plurality of sections, each of which consists of a flat or curved surface as designated and at least one of which has borderlines of discontinuity in at least two directions, comprises shaping the top surface of each of a plurality of blocks into a configuration complementary to the flat or curved surface or surfaces of one or a plurality of the corresponding sections of said effective surface, assembling said plurality of blocks thus shaped in an arrangement according to the arrangement of said sections so as to form a metal mold, pouring synthetic resin such as acrylic resin onto the upper surface of said metal mold and curing said resin. It will, therefore, be seen that the production of a highly precise correcting lens is possible by the method of this invention, if the individual blocks of the metal mold are machined with high precision, and the method is suitable for the mass production of correcting lens. Furthermore, according to the method of this invention it is possible to incline any section of the effective surface in a desired direction and at any desired angle. Hence, by the use of the correcting lens produced by the method of this invention, it is possible to get the rays of exposure light close to the paths of actual electron beams with ease, in the formation of fluorescent dots, to move the fluorescent dots on the fluorescent screen in a desired direction and to arrange the fluorescent dots in conformance to the spots of electron beams over the entire surface of the fluorescent screen. Consequently, by employing the method of the present invention, the problem of color shift on a color picture tube, resulting from a displacement of the fluorescent dots, can be solved.

Although the present invention has been described and illustrated herein with particular reference to square correcting lenses, it will be obvious that the invention can similarly be applied to round correcting lenses.

We claim:

1. A correcting lens for use in the formation of fluorescent dots of a color picture tube, which has its effective surface divided into a plurality of sections each of which consists of a refractive surface and at least some of which have borderlines of discontinuity in at least two directions, the refractive surfaces of said sections being inclined to refract the rays of exposure light close to the actual path of electron beams in the formation of fluorescent dots, whereby color shift resulting from displacement of the fluorescent dots can be eliminated.

2. A correcting lens according to claim 1, wherein at least one of said surfaces is flat.

3. A correcting lens according to claim 1, wherein at least one of said surfaces is curved.

4. A correcting lens according to claim 1, wherein said borderlines of discontinuity of at least one of said sections extend in directions respectively orthogonal to one another.

5. A correcting lens according to claim 4, wherein the borderlines of discontinuity of at least one of said sections are inclined at different angles with respect to one another in said respective orthogonal directions.

6. A correcting lens according to claim 1, wherein said borderlines of discontinuity of a plurality of said sections extend in directions respectively orthogonal to one another.

7. A correcting lens according to claim 6, wherein the refractive surfaces of a plurality of said sections are inclined at different angles in said respective orthogonal directions.

8. A correcting lens according to claim 1, wherein each section has borderlines of discontinuity in all directions between it and the adjoining sections.

9. A correcting lens according to claim 1, wherein both refractive surfaces of said lens are divided into a plurality of sections respectively and each section of each surface has borderlines of discontinuity between it and the adjoining surfaces.

10. A corrective lens for use in the formation of fluorescent dots of a color picture tube, said lens comprising an effective surface thereof divided into a plurality of sections each of which consists of a refractive surface, the inclination of which is so designed that light paths through said surface in an exposing process simulate precisely corresponding electron beam paths in an operation of the color picture tube and at least one of which has borderlines of discontinuity in at least two directions, thereby eliminating a mislanding of the electron beam in the operation of the color picture tube resulting in the production of an excellent color picture.

* * * * *